May 15, 1934.   R. LOOS   1,958,969
ROPE CLAMP
Filed Dec. 29, 1933
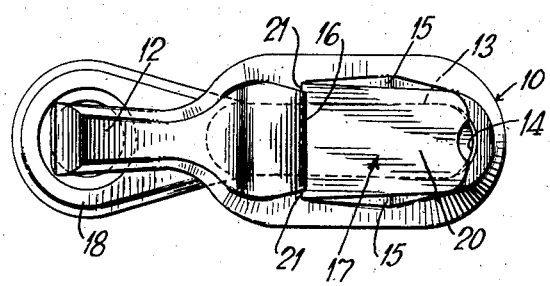
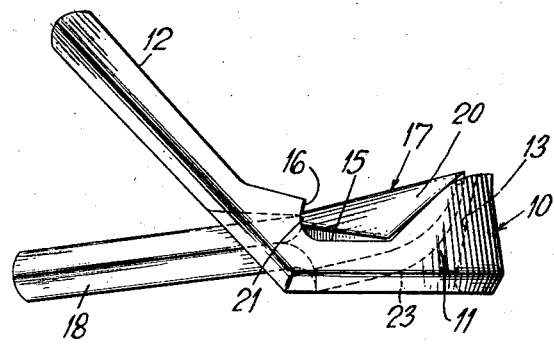
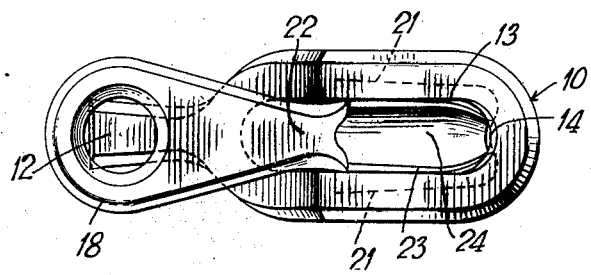
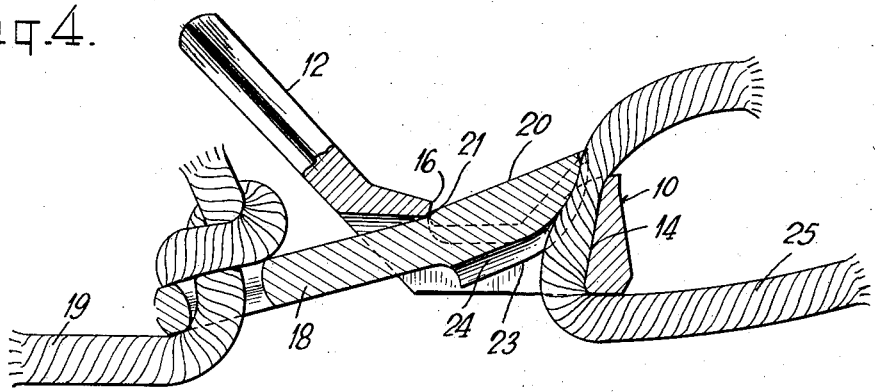
INVENTOR
REINHOLD LOOS
BY
ATTORNEY Patented May 15, 1934

1,958,969

UNITED STATES PATENT OFFICE 1,958,969

ROPE CLAMP

Reinhold Loos, Newark, N. J.

Application December 29, 1933, Serial No. 704,415

6 Claims. (Cl. 24—133)

This invention relates to an improvement in rope clamps and more specifically to an improvement in the rope clamp heretofore patented by me, Patent #1,288,943.

It is an object of this invention to provide a rope clamp which will effect a more firm gripping of the rope without damage to the rope fibers.

It is a further object of the present invention to provide a rope clamp which will firmly grip ropes of varying sizes, without deforming or injuring the rope, even though the rope be of a hard twisted or woven texture, such as is commonly constructed for clothes lines and the like.

It is a further object to provide a clamp which will grip the rope between two relatively movable bodies each of which substantially conforms to the shape of the rope and each of which is free from sharp edges which may tend to cut or damage the rope.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description, taken in connection with the accompanying drawing, in which:—

Figure 1 is a plan view of a clamp embodying this invention.

Figure 2 is a side elevation thereof.

Figure 3 is a bottom plan view.

Figure 4 is a central vertical section.

This invention comprises principally a female member 10 having a body portion 11 and a handle 12 at an angle to the body portion. This member has a slot 13 extending through the body portion terminating at the forward end or end opposite the handle, in a cylindrical surface 14. The upper surface of this member 10 is provided with a cut-out portion 15 forming a shoulder 16.

A male member 17 has an attaching means 18 at one end, for example, an eye through which a rope 19 may be passed, and has at the other end an enlarged portion 20 defined by shoulders 21, the attaching means and the enlarged portion being connected by a neck 22 which can move in the slot 13.

When the member 17 is inserted in place, the shoulders 21 and the shoulder 16 bear against each other to form a pivot of great strength and of sufficient bearing surface to prevent undue wear.

The enlarged portion 20 has upon one face, adapted normally to lie within the slot 13, a grooved shape cam 23 eccentric to the pivot, and having a groove 24. The cylindrical surface 14 and the groove 24 are both in cross-section of substantially the same curvature as the rope to be clamped, but the groove 24 becomes narrower and more shallow toward the end of the member 17.

In use, a rope 25 is inserted through the slot 13 from the side opposite the shoulder 16, between the surface 14 and the groove 24 to be gripped between them. In this position any strain upon the rope will bind the members 10 and 17 tighter together, gripping the rope, but it will clamp the rope between circular surfaces so that the form of the rope will not be damaged. Moreover, the nature of the cam surface is such that the clamping occurs without any teeth upon either surface so that no tearing of the fibers occurs.

The cylindrical surface 14 is inclined at an angle slightly more than 90° to the line of strain between the ropes so that the rope passing through the clamp is bent something more than a right angle as it enters the clamp.

This superior clamping may in part be due to the fact that as the clamping members close, the point of clamping comes nearer and nearer to the line of pressure between the pivot and the attaching means 18 so that a toggle effect is obtained. At the same time the circular shape of the groove and the narrowing toward the point keep the form of the rope intact so that the increased pressure does no damage.

When the free end of the rope is pulled, the cam action is easily released and the cord pulls easily through the clamp. At the same time, the tension holds the clamp almost closed so that on release of the free end, the cord is clamped without slipping back.

This device is particularly useful where relatively hard and close texture ropes are used, such as are used for sash cord or clothes lines.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:—

1. A device of the character described comprising, in combination, a female member having a slot through the body portion, said slot terminating in a stationary cylindrical surface at one end, having in cross section substantially the curvature of the rope to be clamped, a handle at the other end of said body portion at an angle thereto, a male member adapted to extend through said slot and to pivot on said female member at the handle end of said body portion, a grooved surface on said male member eccentric to the pivot of said members and positioned to approach said cylindrical surface as said members are relatively closed, an attachment member at the other end of said male member, the cylindrical surface of said female member being inclined backwardly from the line of strain between the attachment member and a rope engaged between said members.

2. A device of the character described comprising, in combination, a female member having a slot through the body portion, said slot terminating in a stationary cylindrical surface at one end, having in cross section substantially the curvature of the rope to be clamped, a handle at the other end of said body portion at an angle thereto, a male member adapted to extend through said slot and to pivot on said female member at the handle end of said body portion, a grooved surface on said male member eccentric to the pivot of said members and positioned to approach said cylindrical surface as said members are relatively closed, said groove growing shallower and more narrow toward the end of the male member, an attachment member at the other end of said male member, the cylindrical surface of said female member being inclined backwardly from the line of strain between the attachment member and a rope engaged between said members.

3. A device of the character described comprising, in combination, a female member having a slot through the body portion, said slot terminating in a stationary cylindrical surface at one end, having in cross section substantially the curvature of the rope to be clamped, a handle at the other end of said body portion at an angle thereto, a male member adapted to extend through said slot and to pivot on said female member at the handle end of said body portion, a grooved surface on said male member eccentric to the pivot, of said members and positioned to approach said cylindrical surface as said members are relatively closed, said groove growing shallower and more narrow toward the end of the male member, the eccentricity of the grooved surface being such that as the clamp is closed, the rope is gripped at a point increasingly nearer to alignment with the attachment member and the pivot, an attachment member at the other end of said male member, the cylindrical surface of said female member being inclined backwardly from the line of strain between the attachment member and a rope engaged between said members.

4. A device of the character described comprising, in combination, a female member having a slot through the body portion, said slot terminating in a stationary cylindrical surface at one end, said member having its upper surface cut away to a point adjacent to the other end of said slot to form a shoulder, a male member having an attachment means at one end, an enlargement at the other end defined by shoulders adapted to cooperate with the shoulders on the female member, a cam surface on said enlargement to cooperate with said cylindrical surface to grip the rope.

5. A device of the character described comprising in combination a female member having a slot through the body portion, said slot terminating in a stationary cylindrical surface at one end, said member having its upper surface cut away to a point adjacent to the other end of said slot to form a shoulder, a male member having an attachment means at one end, an enlargement at the other end defined by shoulders adapted to cooperate with the shoulders on the female member, a cam surface on said enlargement to cooperate with said cylindrical surface to grip the rope, said cam surface comprising an eccentric groove of substantially the curvature of the rope to be clamped, and becoming of less depth and width toward the end of the male member.

6. A device of the character described comprising, in combination, a female member having a slot through the body portion, said slot terminating in a stationary cylindrical surface at one end, said member having its upper surface cut away to a point adjacent to the other end of said slot to form a shoulder, a male member having an attachment means at one end, an enlargement at the other end defined by shoulders adapted to cooperate with the shoulders on the female member, a cam surface on said enlargement to cooperate with said cylindrical surface to grip the rope, said cam surface comprising an eccentric groove of substantially the curvature of the rope to be clamped, and becoming of less depth and width toward the end of the male member, said cylindrical surface extending upwardly at an angle greater than 90° to the line of strain between the attaching means and a rope held clamped between said members.

REINHOLD LOOS.